United States Patent [19]

Warren et al.

[11] Patent Number: 4,810,970

[45] Date of Patent: Mar. 7, 1989

[54] OIL-BASED FLUSHED ZONE ELECTROMAGNETIC WELL LOGGING SYSTEM AND METHOD

[75] Inventors: Wayne F. Warren; Donald L. Johnson, Jr., both of Houston, Tex.

[73] Assignee: Texaco Inc., White Plains, N.Y.

[21] Appl. No.: 945,438

[22] Filed: Dec. 22, 1986

[51] Int. Cl.⁴ .......................... G01V 3/30; G01V 3/38
[52] U.S. Cl. ...................................................... 324/338
[58] Field of Search .................................. 324/338-341

[56] References Cited

U.S. PATENT DOCUMENTS

| | | | |
|---|---|---|---|
| 3,551,797 | 12/1970 | Gouilloud et al. | 324/338 |
| 4,107,597 | 8/1978 | Meador et al. | 324/339 X |
| 4,401,947 | 8/1983 | Cox | 324/338 |
| 4,422,043 | 12/1983 | Meador | 324/338 |
| 4,451,789 | 5/1984 | Meador | 324/338 |
| 4,609,873 | 9/1986 | Cox et al. | 324/338 |
| 4,622,518 | 11/1986 | Cox et al. | 324/339 X |

OTHER PUBLICATIONS

Grubb et al., Borehole Measurements . . . in the 300 KHz to 25 MHz Frequency Range, Radio Science, vol. 11, No. 4, pp. 275–283, Apr. 1976.

*Primary Examiner*—Gerard R. Strecker
*Attorney, Agent, or Firm*—Robert A. Kulason; James J. O'Loughlin; Ronald G. Gillespie

[57] ABSTRACT

An electromagnetic energy well logging system and method includes transmitting electromagnetic energy substantially at a frequency of 4 MHz into an earth formation from a borehold traversing the earth formation. The true resistivity of an oil-based flushed zone of the earth formation is derived in accordance with the transmitted electromagnetic energy after it is passed through at least a portion of the oil-based flushed zone.

4 Claims, 3 Drawing Sheets

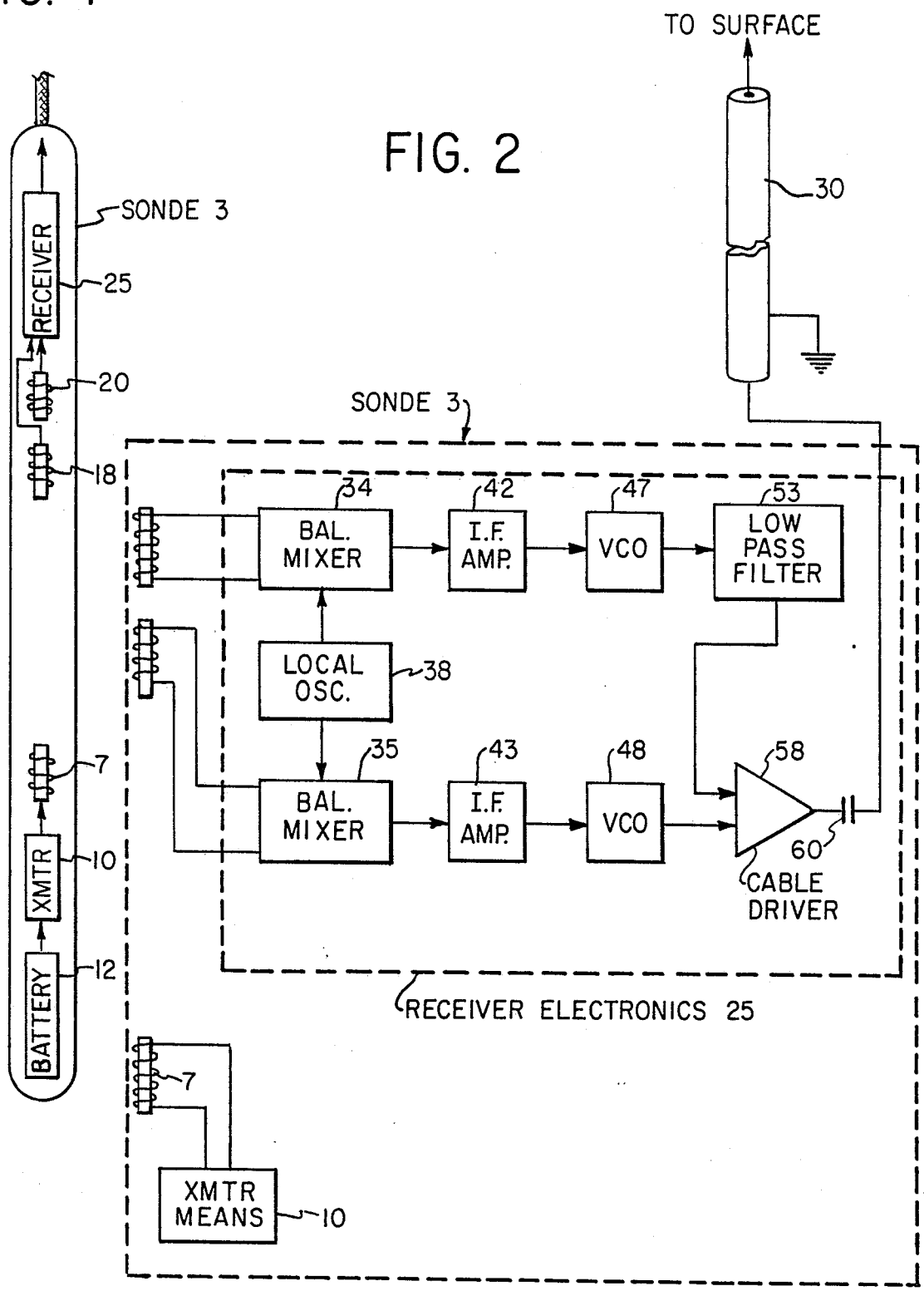

ived from voltage controlled oscillators
OIL-BASED FLUSHED ZONE ELECTROMAGNETIC WELL LOGGING SYSTEM AND METHOD

BACKGROUND OF THE INVENTION

Field of the Invention

The present invention relates to well logging systems and methods in general and, more particularly, to electromagnetic energy well logging systems and methods.

SUMMARY OF THE INVENTION

An electromagnetic energy well logging system and method includes transmitting electromagnetic energy substantially at a frequency of 4 MHz into an earth formation from a borehole traversing the earth formation. The true resistivity of an oil-based flushed zone of the earth formation is derived in accordance with the transmitted electromagnetic energy after it is passed through at least a portion of the oil-based flushed zone.

The objects and advantages of the invention will appear more fully, hereinafter, from a consideration of the detailed description which follows, taken together with the accompanying drawings, wherein one embodiment of the invention is illustrated by way of example. It is to be expressly understood, however, that the drawings are for illustration purposes only and are not to be construed as defining the limits of the invention.

DESCRIPTION OF THE DRAWINGS

FIGS. 1, 2 and 3 are simplified block diagrams of a well logging system constructed in accordance with the present invention.

DESCRIPTION OF THE INVENTION

Figure 3:
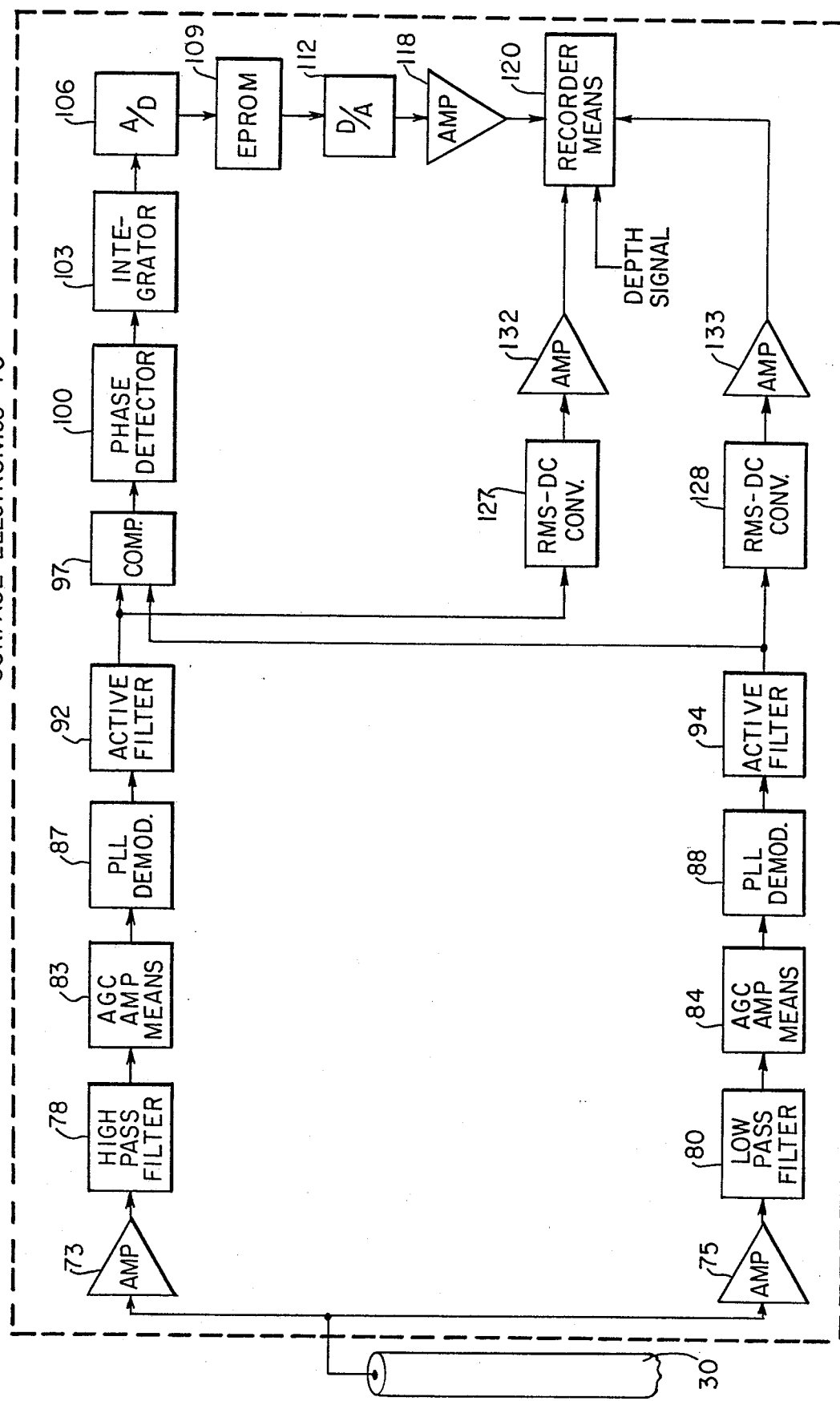

Short-spaced shallow investigation resistivity tools are used to provide flushed zone data for delineation of thin beds, movable oil estimation and invasion correction of true resistivity $R_t$. Usually standard service company tools do a good job of providing the necessary data for these tasks; however, when oil-based muds are used in the borehole drilling, these devices will not function since they require that current be injected through the mud and mud cake into the formation. The high resistivity of the oil-based mud does not allow this current to be injected. A tool, constructed in accordance with the present invention, provides an oil-based flushed zone (i.e. the flushed zone where oil-based muds were used in drilling) investigation.

Basically the tool of the present invention is a modification of a tool previously described in application Ser. No. 890,209; filed July 28, 1986, and uses electromagnetic propagation to measure resistivity and therefore does not require a conductive mud in the borehole.

With reference to FIG. 1, there is shown a well logging sonde 3 having a transmitter coil 7 energized by transmitter means 10, receiving power from a battery 12, located a distance of 12 inches from mid-coil of transmitter coil 7 to mid-coil of a receiver coil 18. Further, another receiver coil 20 has its mid-point spaced 18 inches from the mid-point of transmitter coil 7. Thus, the distance from mid-point of receiver coil 18 to mid-point of receiver coil 20 is 6 inches. The spacing between coils 7 and 18 and between coils 7 and 20 of the aforementioned U.S. patent application is 43 inches and 49 inches, respectively. Receiver coils 18 and 20 receive the electromagnetic energy that has propagated through the formation and provides corresponding signals to receiver electronics 25.

Receiver electronics 25 provides a signal to the surface by way of a conventional well logging cable 30.

Referring to FIG. 2, transmitter means 10 energizes coil 7 so as to transmit electromagnetic energy into the earth formation substantially at a 4 MHz frequency. Coils 18 and 20 receive the electromagnetic energy from the earth formation and provide corresponding signals. The signals from coils 18, 20 are processed in a conventional manner, namely they are provided to balanced mixers 35 and 34, respectively, where the 4 megahertz signals are heterodyned to a lower frequency (preferably 2 kilohertz) by action of a local oscillator 38. The signals from mixers 34 and 35 are provided to IF amplifiers 42 and 43, respectively which in turn provide their amplified signals to voltage controlled oscillators 47 and 48, respectively. The signal from voltage controlled oscillator 47 is provided to a low pass filter 53 which passes the lower frequency signals to a cable driver 58 also receiving the signal from voltage control oscillator 48. Cable drive 58 in effect combines the two signals and provides them through a blocking capacitor 60 to the inner conductor of a well logging cable 30 whose armored shield is grounded.

With reference to FIG. 3, surface electronics 70 includes amplifiers 73 and 75 amplifying the signal from well logging cable 30 and provides the amplified signals to a high pass filter 78 and a low pass filter 80, respectively. The effect of high pass filter 78 and low pass filter 80 is to separate the signals according to receiver coil so that in effect the signal provided by high pass filter 78 corresponds to the signal provided by coil 18, while the signal provided by low pass filter 80 corresponds to the signal provided by coil 20. The signals from high pass filter 78 and low pass filter 80 are provided to automatic gain control amplifier means 83 and 84, respectively, which in turn provides the amplified signals to phase lock loop demodulators 87 and 88, respectively, whereas to reconstitute the signals of coils 18 and 20, respectively. The signals from phase lock loop demodulators 87 and 88 are provided to active filter 92 and 94. The outputs of filters 92 and 94 are provided to a comparator 97 which provides a signal to phase detector 100. Phase detector 100 provides a signal representative of the phase difference between the two signals provided by filter 92 and 94 to an integrator 103. Integrator 103 provides the integrated signal to an analog-to-digital converter 106, which in turn provides digital signals to EPROM 109. EPROM 109, as its name title indicates, is an erasable programmable read-only memory which has stored in it information related to resistivity values in a manner so that the digital phase signal selects the proper resistivity value associated with that phase difference. The digital signal representative of the resistivity values from EPROM 109 are provided to a digital-to-analog converter 112 where they are converted into an analog signal representative of the formation resistivity. The analog signal from digital-to-analog converter 112 is provided to an amplifier 118 which in turn provides an amplified signal to recorder means 120. Recorder means 120 is a conventional analog chart recorder means receiving a depth signal or depth pulses which are provided in a conventional manner by the sheave wheels used in raising and lowering the well logging sonde 3. All of the foregoing relating to the depth signal is well known in the art and is not shown except to show that there is a signal for convenience of description.

The signals from active filters 92 and 94 are also provided to RMS-DC converters 127 and 128 which provide DC signals to amplifiers 132 and 133, respectively. Amplifiers 132 and 133 provide signals to recorder means 120 representative of the signals received by receiver coils 18 and 20, respectively.

Figure 5:
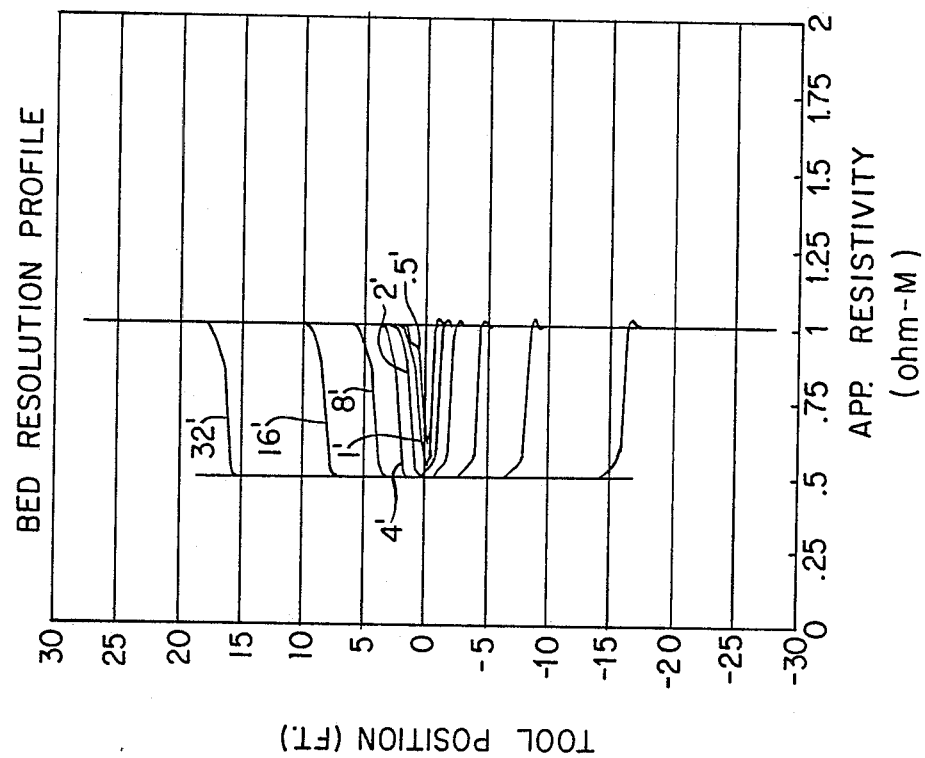
FIGS. 4 and 5 depict bed resolution for two computer simulated cases utilizing the system and method of the present invention.
Figure 4:
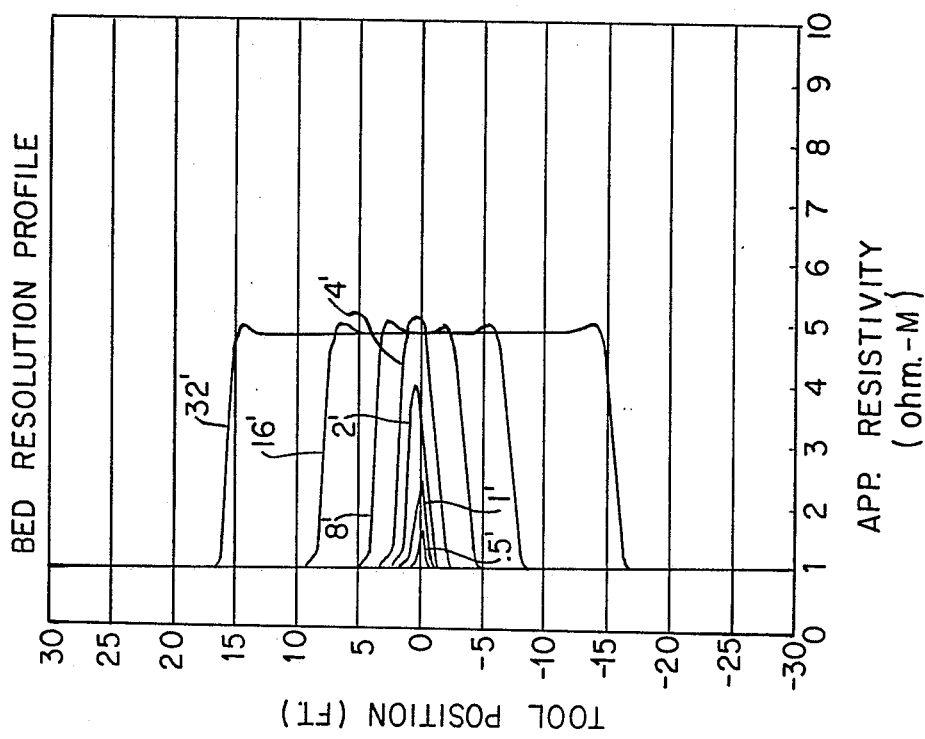

FIGS. 4 and 5 show the bed resolution for two computer simulated cases. FIG. 2 shows the vertical resolution in a water sand simulation. Note that the system provides a resistivity value of 75% of $R_t$ even in a bed only 6 inches thick and reads $R_t$ exactly for a 2 foot thick bed. FIG. 3 simulates an oil sand where the tool will resolve a 6 inch thick bed and reads $R_t$ for a 4 foot thick bed. These computer simulations do not include a flushed zone and are presented just to show the excellent vertical resolution which is at least as good as the industry accepted spherically focused log (SFL) and the Laterolog 8 (LL8) which are standard shallow-investigation resistivity tools.

The computer model studies also show that the diameter of investigation is approximately 20 inches which is about the same as the SFL and LL8.

What is claimed is:

1. An electromagnetic energy well logging system comprising:
   means for transmitting electromagnetic energy substantially at a frequency of 4 MHz into an earth formation from a borehole traversing the earth formation; and
   means for deriving the true resistivity of an oil-based flushed zone of the earth formation in accordance with transmitted electromagnetic energy after the transmitted electromagnetic energy has passed through at least a portion of the oil-based flushed zone,
   the deriving means includes:
   means for receiving the transmitted electromagnetic energy after it has passed through at least a portion of the oil-based flushed zone at two locations in the borehole and providing signals corresponding thereto,
   means connected to the receiving means for determining the phase difference between the received electromagnetic energies and providing a corresponding phase difference signal, and means connected to the phase difference means for determining the true resistivity of the oil-based flushed zone in accordance with the phase difference signal.

2. A system as described in claim 1 in which the receiver means includes:
   a pair of receiver coil means, one receiver coil means being spaced twelve inches from the transmitter means and the other receiver coil means being spaced eighteen inches from the transmitter means.

3. An electromagnetic energy well logging method comprising the steps of:
   transmitting electromagnetic energy substantially at a frequency of 4 MHz into an earth formation from a borehole traversing the earth formation; and
   deriving the true resistivity of an oil-based flushed zone of the earth formation in accordance with transmitted electromagnetic energy after the transmitted electromagnetic energy has passed through at least a portion of the oil-based flushed zone,
   the deriving step includes:
   receiving the transmitted electromagnetic energy after it has passed through at least a portion of the oil-based flushed zone at two locations in the borehole,
   providing received energy signals corresponding to the received electromagnetic energies,
   determining the phase difference between the received energy signals,
   providing a phase difference signal representative of the determined phase difference and determining the true resistivity of the coil-based flushed zone in accordance with the phase difference signal.

4. A method as described in claim 3 in which the receiving step includes:
   receiving electromagnetic energy at one location in the borehole twelve inches from where the electromagnetic energy is transmitted into the earth formation, and
   receiving electromagnetic energy at another location in the borehole eighteen inches from where the electromagnetic energy is transmitted into the earth formation.

* * * * *